United States Patent Office 3,364,182
Patented Jan. 16, 1968

3,364,182
POLYMERIZATION OF METHYL METHACRYLATE IN THE PRESENCE OF A POLYTHIOL
Richard McDonald Griffith, Rowayton, Conn., assignor to American Cyanamid Company, Stamford, Conn., a corporation of Maine
No Drawing. Filed Oct. 7, 1965, Ser. No. 493,870
8 Claims. (Cl. 260—79)

ABSTRACT OF THE DISCLOSURE

The instant invention relates to a method for the production of polymers of methyl methacrylate wherein the polymerization is conducted in the presence of a material which contains at least two mercaptan groups.

Polymers of methyl methacrylate have been produced according to many prior art methods. That is to say, methyl methacrylate has been homopolymerized and copolymerized to high molecular weight polymers by batch or continuous solvent, bulk, dispersion and emulsion procedures. Each of these methods results primarily in a satisfactory product. However, the processes for the production of these polymers are continually being investigated with the thought of improving the properties of the resultant polymers.

To this end, I have now found that any of these prior art procedures can be modified so as to produce polymers of methyl methacrylate having properties superior to those polymers previously produced.

Chain transfer agents such as dodecyl mercaptan are usually utilized in order to decrease the molecular weight of a given polymer at a certain polymerization rate. The use of a polymercaptan according to my invention unexpectedly results in the opposite being achieved. That is to say, utilizing my method, residual thiol groups are attached to the resultant polymer chain thereby promoting heat stability and additionally enabling subsequent reactions of the polymer based on thiol reactivity, i.e. grafting reactions. Furthermore, my process achieves the general effects derived with the use of monothiols (U.S. Patent No. 2,450,000) with an additional unexpected increase in molecular weight at an equivalent thiol group concentration. Therefore, the use of the polythiol allows modification of more polymer end groups than a monothiol at equal molecular weights and reaction rate in addition to increased heat stability. Also, the use of a polythiol permits increased rates of reaction, hence more economical processing at equal molecular weights. Surprisingly, my process enables an increase in molecular weight even above that when no thiol is used, thus producing a polymer not capable of being produced by prior methods at optimum molecular weight and reaction rate.

More precisely, for complete conversion and at constant conditions (composition, rates, temperature, etc.) the use of my process enables the production of a polymer having a molecular weight 25% higher than when no thiol is used, the concentration of polythiol being that at which the rate of transfer is equal to the rate of initiation. Furthermore, for varying conversion and varying thiol concentration, by controlling conversion the average number of residual thiols may be controlled and therefore the molecular weight.

It can therefore be seen, that the polythiol acts both as a unit from which more than one polymer branch may grow and as a unit which shortens the length of the branch and alters its terminal structure. Molecular weight and rate of polymerization are therefore varied by varying the functionality of the thiol. By my process, I may therefore modify more end groups, i.e. increase heat stability or increase the rate of polymerization without reducing the molecular weight of the resultant polymer.

It is therefore an object of the present invention to provide an improved process for the production of polymers of methyl methacrylate wherein the polymerization is conducted in the presence of a material which contains at least two mercaptan groups.

These and other objects will become more apparent to those skilled in the art upon reading the more detailed description set forth hereinbelow.

As mentioned above, any process for the polymerization of methyl methacrylate can be improved by the novel feature described above. That is to say, polymers produced from methyl methacrylate, whether produced by bulk, solvent or emulsion procedures (continuous or batch) are improved in heat stability and/or molecular weight by the use of a polymercaptan additive during the production thereof.

A preferred process is the polymerization of methyl methacrylate at temperatures of 10° C. to 110° C. in the presence of a free-radical generating catalyst, with a solvent or emulsifier.

Examples of suitable catalysts include the organic peroxides such as methyl ethyl ketone peroxide, benzoyl peroxide; the hydroperoxides such as cumene hydroperoxide; the persulfate type compounds such as potassium sulfate, or materials such as azobisisobutyronitrile and the like. Additionally, I may use, such catalysts as lauroyl peroxide, 2,5-dimethyl-2,5-di(t-butylperoxy)hexane, the dialkyl peroxides, e.g., diethyl peroxide, dipropyl peroxide, dilauryl peroxide, dioleyl peroxide, distearyl peroxide, di-(tertiary-butyl) peroxide and di-(tertiary-amyl) peroxide; the alkyl hydrogen peroxides, e.g., tertiary-butyl hydroperoxide, tertiary-amyl hydroperoxide, etc.; symmetrical diacyl peroxides, for instance, acetyl peroxide, propionyl peroxide, lauroyl peroxide, stearoyl peroxide, malonyl peroxide, succinyl peroxide, phthaloyl peroxide, unsymmetrical or mixed diacyl peroxides, e.g. acetyl benzoyl peroxide, propionyl benzoyl peroxide, etc.; terpene oxides, e.g. ascaridole, etc.; and salts of inorganic per-acids, e.g. ammonium persulfate, sodium persulfate, sodium percarbonate, potassium percarbonate, sodium perborate, potassium perborate, sodium perphosphate, potassium perphosphate, etc. Other examples of catalysts which may be employed are the following: tetralin hydroperoxide, tertiary-butyl diperphthalate, tertiary-butyl perbenzoate, 2,4-dichloro benzoyl peroxide, urea peroxide, caprylyl peroxide, p-chlorobenzoyl peroxide, 2,2-bis(tertiary-butylperoxy) butane, hydroxyheptyl peroxide, the diperoxide of benzaldehyde and the like. Generally the water-soluble, as well as the monomer-soluble, types of catalyst may be employed in amounts ranging from about 0.05 to 5.0 parts, by weight, of the monomer employed.

When emulsion polymerization processes are modified according to my improved process, any available emulsifier may be used, with compounds such as fatty acid soaps, rosin soaps, sodium lauryl sulfate; non-ionic emulsifiers such as polyethoxy alkylated phenols; compounds such as dioctyl sodium sulfosuccinate, dihexyl sodium sulfosuccinate and the like, in amounts known in the art, being exemplary.

The methyl methacrylate being reacted may be homoploymerized or copolymerized. That is to say, the methyl methacrylate may be used in amounts ranging from 50% to 100%, by weight, based on the weight of monomers, the remaining monomer, if any, ranging in concentration from up to about 50%, by weight.

Examples of monomers which may be copolymerized with the methyl methacrylate and which may be concentration either singly or in a plurality (two, three, four or any desired number) are such monomers as the unsaturated alcohol esters, more particularly the allyl, methallyl, crotyl, vinyl, butenyl, etc., esters of saturated and unsaturated aliphatic and aromatic monobasic and polybasic acids such, for instance, as acetic, propionic, butyric, crotonic, succinc, glutaric, adipic, maleic, fumaric, itaconic, benzoic, phthalic, terephthalic, etc., acids; the saturated monohydric alcohol esters, e.g., the methyl, ethyl, propyl, butyl, etc., esters of ethylenically unsaturated aliphatic monobasic and polybasic acids, illustrative examples of which appear above; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri-, and tetra-chlorostyrenes, -bromostyrenes, -fluorostyrenes, -methylstyrenes, -ethylstyrenes, -cyanostyrenes, etc., vinyl pyridine, divinyl benzene, diallyl benzene, the various alpha substituted styrenes and alpha substituted ring-substituted styrenes, e.g., alpha-methyl styrene, alpha-methyl-para-methyl styrene, etc.; unsaturated ethers, e.g., ethyl vinyl ether, diallyl ether, etc. unsaturated amides, for instance, N-allyl caprolactam, acrylamide, and N-substituted acrylamides, e.g., N-methylol acrylamide, N-allyl acrylamide, etc.; unsaturated ketones, e.g., methyl vinyl ketone, etc.; the alkyl acrylates such as ethyl acrylate, etc.; acrylonitrile, ethylene and the like.

Other examples of monomers that can be copolymerized with the methyl methacrylate are the vinyl halides, more particularly vinyl fluoride, vinyl chloride, vinyl bromide and vinyl iodide, and the various vinylidene compounds, including the vinylidene halides, e.g., vinylidene chloride, vinylidene bromide, vinylidene fluoride and vinylidene iodide.

When a solvent system is used, such solvents as benzene, toluene, xylene, aliphatic esters, naphthalene, trichlorobenzene, dimethylformamide, and the like, are exemplary.

Any material which contains at least two mercaptan groups may be utilized according to our novel process. Examples of useful materials include trimethylolethane tris (3-mercaptopropionate), pentaerythritol tetra(3-mercaptopropionate), dithiolterephthalic acid, glycol dimercaptoacetate, glycol dimercaptopropionate, pentaerythritol tetrathioglycolate, trimethylolethane trithioglycolate, trimethylolpropane tris(3-methcaptopropionate), trimethylolpropane trithioglycolate and the like.

The polythiol should be utilized in concentrations ranging from about 0.05% to 1.0%, preferably 0.1% to 0.9%, by weight, based on the weight of the monomer or monomers undergoing polymerization.

The following examples are set forth for purposes of illustration only and are not to be construed as limitations on the instant invention except as set forth in the appended claims. All parts and percentages are by weight unless otherwise specified.

*Example 1*

To a suitable reaction vessel equipped with stirrer and baffles are added:

700 parts of methyl methacrylate,
21 parts of ethyl acrylate,
7 parts of stearyl alcohol,
1.4 parts of azobisisobutyronitrile, and
0.2% of pentaerythritol tetra(3-mercaptopropionate)
 [thiol concentration—1.6 moles/$10^5$ gm.]

To this "monomer phase" is then added an aqueous phase of:

773 parts of deionized water,
31 parts of 1% solution of poly(sodium methacrylate), and
2 parts of $Na_2HPO_4$ (anh.)

The mixture is purged with nitrogen and brought to 83° C. under vigorous agitation. Due to the heat of polymerization, the temperature is maintained steady without further heating until, after about an hour, the temperature increases to 90–95° C. The reaction mixture is then heated to 100° C. and maintained at said temperature for 10 minutes. After cooling to room temperature, the mixture is filtered and slurried in water. The resultant poly(methyl methacrylate) beads are dried and tested for heat stability. The inherent viscosity is 0.75 as measured in benzene at 23° and the melt index is .13.

The heat stability test is conducted as follows: A portion of the beads are placed in a suitable container, flushed with nitrogen and sealed. The container is heated to 280° C. for 75 minutes and then thrust into a mixture of Dry Ice and acetone for 15 minutes. The container is then opened and 10 parts of chloroform are added. The resultant material is then subjected to vapor phase chromatography. According to this test, 2.9% of methyl methacrylate is shown.

Following the procedure of Example 1, various thiols are utilized during the methyl methacrylate polymerization in varying concentrations. The results are set forth in Table I, below.

TABLE I

| Ex. | Thiol | Thiol Conc., moles/$10^5$ gm. | Thiol, wt. percent | Heat Stability | | |
|---|---|---|---|---|---|---|
| | | | | Temp., °C. | Time, min. | V.P.C.,* percent |
| 1 | PTM | 1.6 | 0.2 | 280 | 75 | 2.9 |
| 2 | PTM | 4.0 | 0.5 | 280 | 75 | 2.6 |
| 3 | PTM | 4.9 | 0.6 | 280 | 75 | 2.8 |
| 4 | n-DDM | 2.0 | 0.4 | 280 | 75 | 4.4 |
| 5 | PTM | 4.0 | 0.5 | 300 | 75 | 6.4 |
| 6 | PTM | 6.2 | 0.75 | 300 | 75 | 5.6 |
| 7 | n-DDM | 2.0 | 0.4 | 300 | 75 | 8.7 |
| 8 | PTM [1] | 4.0 | 0.5 | 280 | 75 | 3.9 |
| 9 | n-DDM [1] | 2.0 | 0.4 | 280 | 75 | 4.4 |
| 10 | Octadecane thiol | 1.4 | 0.4 | 280 | 75 | 4.6 |
| 11 | Butane thiol | 2.2 | 0.2 | 280 | 75 | 4.7 |
| 12 | Methyl-α-methyl-β-mercaptopropionate | 1.8 | 0.2 | 280 | 75 | 4.3 |
| 13 | Dithiolterephthalic acid | 4.0 | 0.4 | 280 | 75 | 3.0 |
| 14 | Trimethylolethane trithioglycolate | 3.5 | 0.4 | 280 | 75 | 3.1 |
| 15 | Glycol dimercaptoacetate | 3.8 | 0.4 | 280 | 75 | 2.9 |
| 16 | Trimethylolpropane tris(3-mercaptopropionate) | 3.1 | 0.4 | 280 | 75 | 3.2 |

[1] Solution polymerization in 70% toluene at 110° C, 4.75 hrs., 0.2% 2,5-dimethyl-2,5-di(t-butylperoxy) hexane as catalyst.
*Vapor phase chromatography, percent methyl methacrylate shown.
PTM=Pentaerythritol tetra (3-mercaptopropionate).
n-DDM=n-Dodecyl mercaptan.

The polymers produced in Examples 1–16 and others are subjected to measurements to determine the properties thereof. The results are set forth in Table II, below.

adding to the reaction media, before polymerization, from about 0.05% to about 1.0%, by weight, based on the weight of the polymerizable monomers of a material

| Ex. | Polymer of Ex. No. | Inherent Viscosity [a] | Izod Impact Strength (lb.-in./in notch) | Tensile Strength (p.s.i.×10³) | Tensile Modulus (p.s.i.×10⁶) | Elongation (percent) | Flexural Strength (p.s.i.×10³) | Flexural Modulus (p.s.i.×10⁶) | Melt Index [b] |
|---|---|---|---|---|---|---|---|---|---|
| 17 | 4 | .34 | .36 | 9.9 | .48 | 4.5 | 17.9 | .49 | 4.8 |
| 18 | 2 | .44 | .38 | 10.4 | .47 | 5.9 | 19.2 | .49 | 1.2 |
| 19 | 1 | .75 | .38 | 10.4 | .49 | 5.6 | 18.6 | .49 | |
| 20 | 3 | .39 | .31 | 9.7 | .48 | 3.3 | 17.3 | .49 | 3.2 |
| 21 | 6 | .34 | | 9.6 | .47 | 3.1 | 12.5 | .47 | 6.2 |
| 22 | c 22 | .53 | | | | | | | |
| 23 | d 23 | .60 | | | | | | | |
| 24 | 10 | .32 | | | | | | | |
| 25 | 11 | .35 | .34 | 9.5 | .46 | 4.4 | 17.1 | .48 | 4.7 |
| 26 | 12 | .31 | .37 | 10.1 | .49 | 4.6 | 18.3 | .49 | 4.8 |
| 27 | 13 | .38 | .33 | 9.1 | .45 | 4.3 | 16.9 | .47 | 4.4 |
| 28 | 14 | .48 | | | | | | | |
| 29 | 15 | .38 | | | | | | | |
| 30 | 16 | .44 | | | | | | | |

[a] Measured at 23° C. in benzene.
[b] ASTM D1238–62T (cond. 1)
[c] Trimethylethane tris(3-mercaptopropionate) used; thiol conc., 2.1; weight percent, 0.27%.
[d] PTM used; thiol conc., 2.1; weight percent, .26% (see Table I).

I claim:

1. In the polymerization of methyl methacrylate in the present of an initiator, utilizing bulk, solvent, dispersion or emulsion procedures, the improvement which comprises adding to the reaction media, before polymerization, from about 0.05% to about 1.0%, by weight, based on the weight of methyl methacrylate, of a material selected from the group consisting of trimethylolethane tris(3-mercaptopropionate), pentaerythritol tetra(3-mercaptopropionate), dithioterephthalic acid, glycol dimercaptoacetate, glycol dimercaptopropionate, pentaerythritol tetrathioglycolate, trimethylolethane trithioglycolate, trimethylolpropane tris(3-mercaptopropionate) and trimethylolpropane trithioglycolate.

2. A process according to claim 1 wherein said material is pentaerythritol tetra(3-mercaptopropionate).

3. A method according to claim 1 wherein said material is trimethylolethane tris(3-mercaptopropionate).

4. A method according to claim 1 wherein said material is glycol dimercaptoacetate.

5. In the polymerization of methyl methacrylate, in the presence of an initiator, utilizing bulk, solvent, dispersion or emulsion procedures, wherein the reaction media contains at least 50% methyl methacrylate, the remaining being at least one comonomer copolymerizable therewith and selected from the group consisting of unsaturated alcohol esters, esters of saturated and unsaturated monobasic and polybasic acids, vinyl cyclic compounds, unsaturated ethers, unsaturated amides, unsaturated ketones, alkyl acrylates, acrylonitriles, ethylene, vinyl halides and vinylidene halides, the improvement which comprises adding to the reaction media, before polymerization, from about 0.05% to about 1.0%, by weight, based on the weight of the polymerizable monomers of a material selected from the group consisting of trimethylolethane tris(3-mercaptopropionate), pentaerythritol tetra(3-mercaptopropionate), dithioterephthalic acid, glycol dimercaptoacetate, glycol dimercaptopropionate, pentaerythritol tetrathioglycolate, trimethylolethane trithioglycolate, trimethylolpropane tris(3-mercaptopropionate) and trimethylolpropane trithioglycolate.

6. A method according to claim 5 wherein said material is pentaerythritol tetra(3-mercaptopropionate).

7. A method according to claim 5 wherein said material is trimethylolethane tris(3-mercaptopropionate).

8. A method according to claim 5 wherein said material is glycol dimercaptoacetate.

References Cited

UNITED STATES PATENTS

| | | |
|---|---|---|
| 2,450,000 | 9/1948 | Howk et al. _____ 260—79 |
| 2,922,774 | 1/1960 | Mino et al. _____ 260—895 |
| 2,922,775 | 1/1960 | Mino et al. _____ 260—895 |
| 3,260,736 | 7/1966 | Martin et al. _____ 260—79 |

FOREIGN PATENTS

| | | |
|---|---|---|
| 752,269 | 7/1956 | Great Britain. |
| 907,426 | 10/1962 | Great Britain. |
| 975,907 | 11/1964 | Great Britain. |

DONALD E. CZAJA, *Primary Examiner.*

LEON J. BERCOVITZ, *Examiner.*

M. I. MARQUIS, *Assistant Examiner.*